United States Patent [19]

Dragasevich

[11] Patent Number: 4,842,747
[45] Date of Patent: Jun. 27, 1989

[54] BAG FILTER

[75] Inventor: John Dragasevich, Willowdale, Canada

[73] Assignee: GAF Corporation, Wayne, N.J.

[21] Appl. No.: 157,387

[22] Filed: Feb. 18, 1988

[51] Int. Cl.⁴ .............................................. B01D 37/00
[52] U.S. Cl. ................................... 210/767; 210/413; 210/451; 210/453
[58] Field of Search ............... 210/767, 770, 335, 413, 210/415, 485, 451–453; 366/250, 251, 279, 605

[56] References Cited

U.S. PATENT DOCUMENTS

| | | |
|---|---|---|
| 3,367,506 | 2/1968 | Rosaen ............................ 210/415 X |
| 3,491,889 | 1/1970 | Walters ........................... 210/415 X |
| 3,814,261 | 6/1974 | Morgan ............................... 210/453 |
| 3,849,309 | 11/1974 | Morris ............................ 210/485 X |
| 4,328,103 | 5/1982 | Kraeling et al. ................ 210/413 X |
| 4,442,003 | 4/1984 | Holt ................................ 210/451 X |

Primary Examiner—Charles Hart
Attorney, Agent, or Firm—Richard T. Laughlin; Anthony Lagani, Jr.; Joshua J. Ward

[57] ABSTRACT

The disclosure relates to a fluid filter of the bag type that has a rotatable agitator means mounted within the filter chamber.

18 Claims, 2 Drawing Sheets

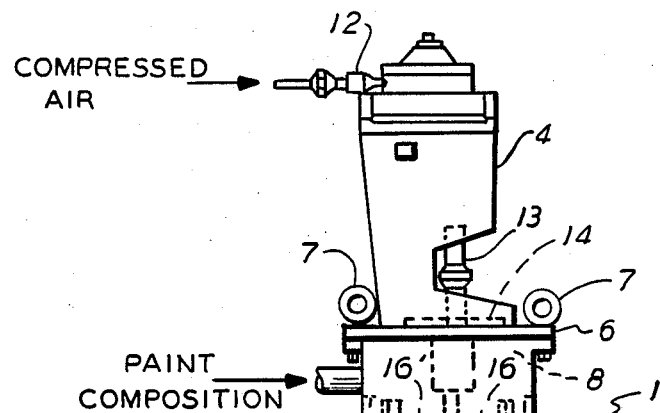
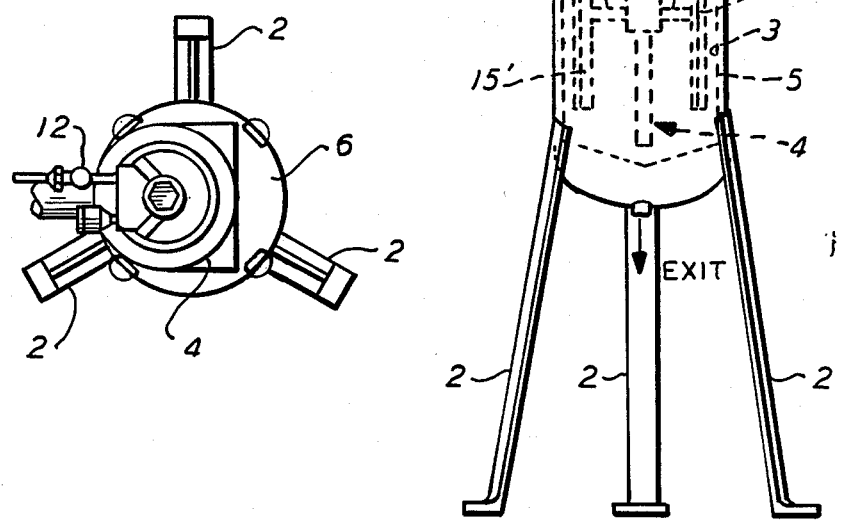

BAG FILTER

This invention relates to fluid filtering devices and, in particular, to such devices for use with liquids containing flake like particles.

THE PRIOR ART

With the advent of aqueous-based paints, current filtration technology was experiencing failure when filtering large flat aluminum pigments or metallic flakes added to aqueous-base paint. Such pigments are used to obtain "wet look" color effects in the paint coat. There are two major problems encountered in filtering such materials. One problem is due to the "pseudoplastic" nature of the paint. A shear must be applied to this paint to make it flowable. The second problem is that the large flat pigments "shingle" or "plate" out at the surface of either the felt or mesh filter material which are usually used in filters for such paints. Both of these problems cause extremely long delays in the filtering process and excessive removal of pigments from the mixture.

Fluid filters incorporating blades or sprays to facilitate filtering have been well known for some time. Typical illustrations of such devices are shown in U.S. Pat. Nos. 1,993,214; 2,363,188; 2,678,732; 3,232,436; 3,349,916; 3,953,325; 4,054,528 and 4,417,246. The filters disclosed in such patents are relatively complex and expensive. Furthermore, such filters are believed ineffective in dealing with plate like particles suspended in a fluid medium because of the blending problem.

THE OBJECTS OF THE INVENTION

It is an object of the invention to provide a simple and effective filter for fluids containing plate like pigment particles. Another object of the invention is to provide such a filter which is relatively inexpensive to produce. A further object of the invention is to overcome the aforesaid disadvantages of the prior art. Other objects and further advantages of the invention will appear from the following detailed description.

SUMMARY OF THE INVENTION

It has now been discovered that a filter such as one which utilizes a filter bag as the filtering element can be effective for use with paint composition containing aluminum pigments or the like by modifying the filter to include a special type of agitation of the paint composition near the surface of the filter element. The filter has a body member with an inner wall defining an axial main filtering chamber. An inlet port is provided in a horizontal plane in the upper portion of the chamber to allow flow of the paint composition into the main filter chamber. An exit port is set in the base of the filter housing through which the filtered paint passes from the filter.

A special blade agitator is placed in the chamber and a back-flush retainer is positioned between the bag and the agitator to prevent contact of the bag with the agitator. It is essential to this invention that the agitation of the paint composition at the surface of the filter bag be maintained. The amount of agitation will depend on the viscosity of the paint composition. Higher viscosities will require a greater force to move the composition. The preferred agitator has twin flat blades which pass close to the surface of the bag and parallel to the surface of the bag. What this invention achieves is a mixer/filter design which creates sufficient shear at the surface of the filter media and pulling of pigments from the surface of the filter bag without interfering with the composition of the paint. Formally, such compositions lead to shingling i.e. overlapping of the pigment particles requiring extended filtering time and/or frequent changing of the filter bag.

THE DRAWINGS

FIG. 1 is a side elevation of the preferred embodiment of the filter of the invention.

FIG. 2 is a perspective view of the top of the filter shown in FIG. 1.

DETAILED DESCRIPTION OF THE INVENTION

Figure 3:
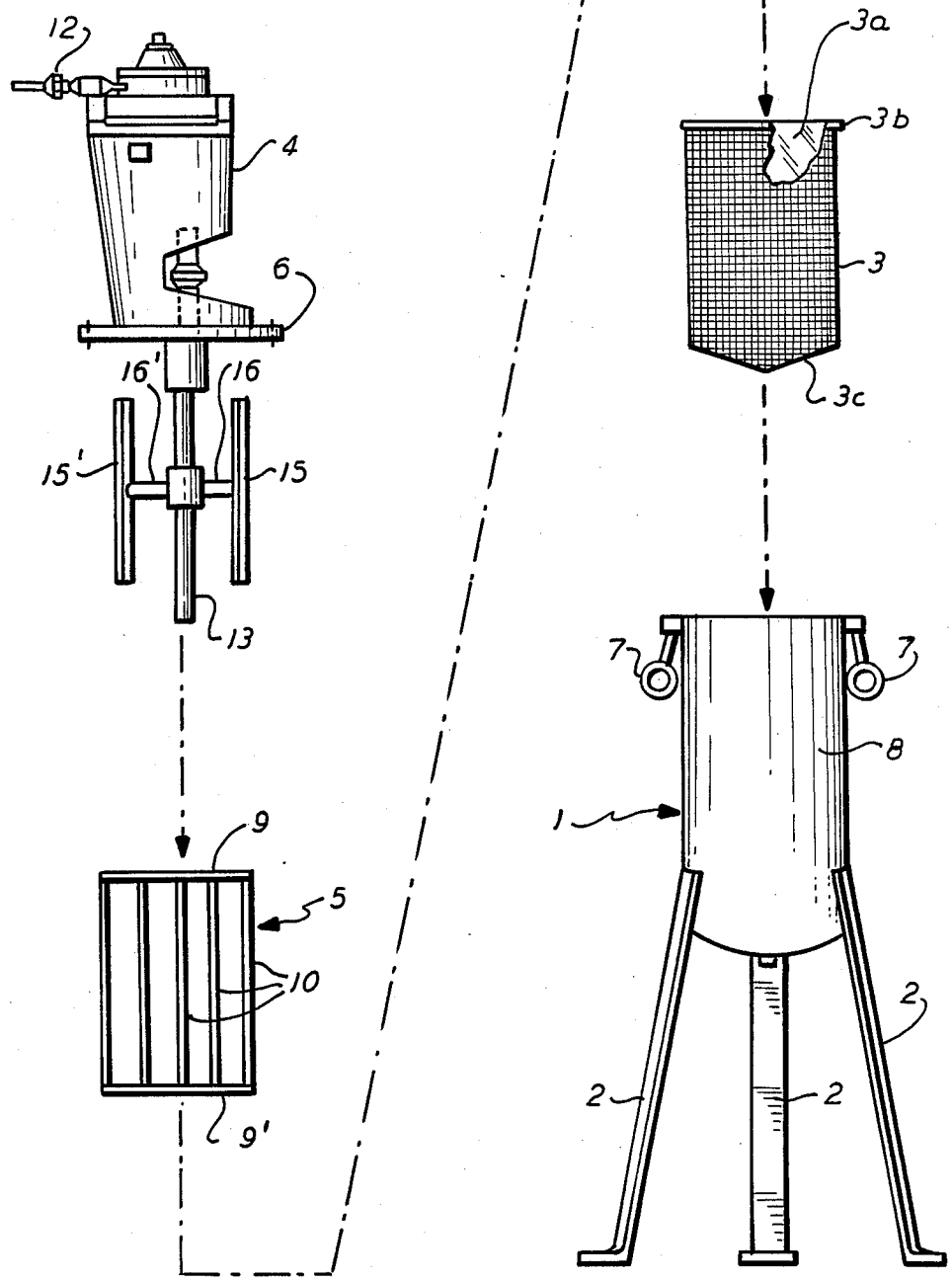
FIG. 3 is a modified exploded view showing the agitator, a backflow retainer, a filter holder, a filter bag and the base of the filter.

Referring to the drawings, the filter unit of this invention comprises a body member generally indicated at 1 supported on legs 2, a straining or filtering bag 3a, a holder of the filtering member 3, an agitating mechanism generally indicated at 4, and a backwash retainer 5 for separating the filter bag 3a from the agitator blades. The paint composition is preferably fed into the filter at a rate of about 5 to about 100 gallons per minute.

Body member 1 has a top cap 6 which is secured to the body member by a series of hinged locking rings 7 or other similar fastening devices. The top 6 is removable to allow access to the main filter chamber flow passage generally indicated at 8. This allows cleaning or changing of the bag 3a used to filter the paint composition. The backwasher retainer generally indicated at 5 is preferably formed of circular top and bottom rims 9,9' with supporting vertical prongs 10 extending between the rings. In the preferred embodiment, the retainer is approximately seven inches in diameter and has eight supporting prongs 10. As is apparent, the retainer can be constructed of a variety of materials and made in a variety of arrangements such as in utilizing six to eight prongs. The filter bag holder 3 is preferably conical shaped at its base 3c and has a ring 3b at its top to form in sealing engagement with the side of the chamber wall so that all of the composition has to pass through the filter element prior to exiting from the chamber through exit port 20. The filter bag 3a can be made of a woven fabric or any of the conventional felted materials.

The agitator 4 is preferably an air driven mixer with the drive element outside of the filter chamber. A unit of approximately ⅓ horse power has been found effective. Compressed air is fed to the drive element through inlet 12. The drive shaft 13 passed into the mixing chamber 8 through a stuffing box 14 which seals the shaft to accommodate the pressure within the filter chamber which generally is of the order of 100 pounds per square inch. Although the agitator is shown as being driven by compressed air which is desirable in explosive atmospheres, it can be an electric motor or any other type of power source.

The agitator is within the filter chamber and consists of twin-blade elements 15, 15' mounted to the shaft 13 on arm ends 16, 16' extending from the mid point of the shaft. The two blades can be adjustable to angle from 0° to 180° in the vertical plane. The angle of the blades will depend in large measure on the thixotropic nature of the paint composition. Adjustment can be made by utilizing a set screw to fix the blades in position. The blades in the preferred arrangement are fifteen inches high, approximately one inch in width and one sixteenth of an inch in thickness. Although the agitator shown has two blades, it could also have three or four blades or more for certain types of compositions. The blades are so configured as to pass approximately one to two inches from the surface of the filter bag and parallel to the sides of the bag. This blade movement creates a turbulent sweeping action of the fluid across the bag thereby preventing adherence of particles in the fluid to the strainer and permitting passage of the pigment particles through the bag. The speed of rotation will depend on the thixotropic nature of the blade paint. With the more viscous compositions, the speed of rotation of the blade will have to be greater or up to 1750 rpm in order to obtain the minimum flow of the composition on the surface of the bag. With more standard paint composition, the speed can be as low as 25 rpm.

In operation, a paint composition containing aluminum particles, MICA or the like is fed into the filter casing. The composition passes into the filter chamber where it is subject to the action of the special agitator of this invention. The composition passes through the filter bag into the space defined by the bag and the inner wall of the chamber and out through the discharge conduit at the base of the filtering house.

The invention has been particularly described in relation to filtering latex paint containing aluminum or MICA flakes but it will be apparent to one skilled in the art that other compositions and other uses can be made of the apparatus and modifications to the apparatus. Such uses and modifications are intended to be included within the scope of the claims.

What is claimed is:

1. A filter for liquids containing suspended flake like particles which comprises a body member having an inner wall defining an axial, main flow passage, an inlet and exit conduit for the liquid to be filtered, an annular straining and filter bag sealingly mounted within said main flow passge so as to define a chamber between the outer surface of said straining bag and said inner wall of the body member, agitator means mounted within said main flow passage so as to be spaced from said filter bag, a filter bag container and a backwash retainer to separate the agitator means from the filter bag, wherein said agitator means includes an adjustable angle blade means.

2. The filter as defined in claim 1 wherein said agitator means comprises two blades parallel to and on opposite sides of a vertical drive shaft of the agitator to which each blade is affixed.

3. The filter as defined in claim 2 wherein said blades are adjustable in the vertical plane from about 0° to 180°.

4. The filter as defined in claim 1 wherein said backwash retainer comprises two spaced apart rings connected to each other by eight vertically extending supporting prongs.

5. The filter as defined in claim 1 wherein said agitator means is driven by compressed air.

6. The filter as defined in claim 1 wherein said agitator means is driven by an electrical motor.

7. The filter as defined in claim 1 wherein said agitator means has its drive motor located outside of the filter body member.

8. The filter as defined in claim 2 wherein said agitation means includes a special controller for maintaining the agitator of the liquid at a low level.

9. The filter as defined in claim 8 wherein said speed is controlled by the angle of the blades.

10. The filter as defined in claim 2 wherein said straining bag is fibrous composition.

11. The filter as defined in claim 2 wherein said straining bag is a woven fabric.

12. The filter as defined in claim 1 wherein said body member has a removable top for allowing removal of the filter bag.

13. A process for filtering a paint composition which contains flake like pigments which comprises feeding a first part of the composition through to a sealed chamber, forcing the composition to a filter element maintained in the sealed chamber, subjecting a second part of the composition to mild shearing action on the surface of the filter element to prevent build up of pigments on the surface of the filter element, drawing the composition through the filter element and then discharging the filtered composition from the sealed chamber.

14. The filter of claim 1 wherein the speed of the agitator means is for about 25 to about 1750 rpm.

15. The filter of claim 1 wherein the filter bag is a fibrous web.

16. The filter of claim 1 wherein the filter bag is a woven fiber fabric.

17. The filter of claim 1 wherein a shearing action is created by air driven blades parallel to the filter bag.

18. The filter of claim 17 wherein the blade passes within about one to two inches from the surface of the filter bag.

* * * * *